(12) United States Patent
You

(10) Patent No.: US 6,777,913 B2
(45) Date of Patent: Aug. 17, 2004

(54) APPARATUS AND METHOD FOR SHORTENING A CHARGING TIME OF A MULTI-BATTERY

(75) Inventor: Dong Jun You, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/188,363

(22) Filed: Jul. 3, 2002

(65) Prior Publication Data
US 2003/0006734 A1 Jan. 9, 2003

(30) Foreign Application Priority Data
Jul. 5, 2001 (KR) .................................. 2001-40153

(51) Int. Cl.⁷ .................................................. H02J 7/00
(52) U.S. Cl. ...................................................... 320/125
(58) Field of Search ................................. 320/125, 126, 320/148, 149, 151, 152, 157, 162, 164

(56) References Cited

U.S. PATENT DOCUMENTS

| | | | |
|---|---|---|---|
| 5,955,868 A | * | 9/1999 | Kaite et al. ................. 320/125 |
| 5,994,875 A | | 11/1999 | Lee ............................. 320/132 |
| 6,064,179 A | * | 5/2000 | Ito et al. ..................... 320/128 |
| 6,194,867 B1 | * | 2/2001 | Cummings et al. ......... 320/119 |
| 6,445,159 B1 | * | 9/2002 | Ramsden ..................... 320/119 |

* cited by examiner

Primary Examiner—Pia Tibbits
(74) Attorney, Agent, or Firm—Fleshner & Kim, LLP

(57) ABSTRACT

An apparatus and a method reduces charging time of a multi-battery with a plurality of battery units. A charging process and apparatus charges a first battery unit of a multi-battery, keeps checking whether a current charging the first battery unit reaches a prescribed value, selects and charges a selected second battery unit of the multi-battery along with the first battery unit if the preset value is reached, and charges the second battery unit with a limited maximum magnitude current when the first battery unit is completely charged. Dual-charging operations for both first and second battery units conducted in the present charging process can reduce total charging time of the multi-battery.

23 Claims, 4 Drawing Sheets

*Prior Art*

APPARATUS AND METHOD FOR SHORTENING A CHARGING TIME OF A MULTI-BATTERY

BACKGROUND OF THE INVENTION

1. Field of the Invention

The present invention relates to a rechargable battery, and in particular to an apparatus and method of reducing charging time of a battery.

2. Background of the Related Art

FIG. 1 is a simplified block diagram showing a conventional charging machine for charging a battery with a plurality of battery units (hereafter "multi-battery") with Li-Ion cells. The charging machine of FIG. 1 includes an AC adaptor 10 that converts an AC power to DC, a step-down charger 20 that transforms the converted DC voltage to a target DC voltage and outputs a charging current below a limited magnitude, and a battery selector 30. The battery selector 30 connects its power rail to one battery unit of a multi-battery 100 to supply a selected battery with the charging current.

The step-down charger 20 is designed such that its charging current is limited to remain within system capabilities. Thus, the limited current magnitude is determined so that a maximum electric power consumed by a system load 40 and used in charging the multi-battery 100 at the same time does not exceed an output rating of the AC adaptor 10.

The charging machine of FIG. 1 charges the battery units sequentially one at a time when charging a multi-battery 100. Namely, after a first battery unit is fully charged, the battery selector 30 disconnects its power rail from the first battery unit and connects its power rail to a next battery unit, and the next battery unit starts to be charged.

Assuming the multi-battery 100 is a dual-battery with two battery units A and B, as shown in FIG. 2 a charging operation of the battery unit B does not start until the battery unit A is completely charged. Therefore, a total charging time $T_{TOT}$ of the dual-battery is equal to sum of a charging time $T_A$ of the battery unit A and a charging time TB of the battery unit B. For example, it takes about 3 hours to charge a notebook computer with a single battery and about 6 hours to charge a notebook computer with a dual-battery.

A Li-ion battery has a feature that a charging current can increase without bound until the battery reaches a target voltage, e.g., 4.2V. However, the output current of the step-down charger 20 has been limited because of the output rating of the AC adaptor 10, so that a Li-ion battery is charged with the limited current until it reaches 4.2V. Since the limited current is constant, such a charging period is called a Constant Current (CC) mode. During the CC mode, a charged voltage increases gradually. After the charged voltage reaches the target voltage (i.e., time $t_a$ and $t_b$ in FIG. 2), it is maintained constant while a charging current tapers. Such a charging period is called a Constant Voltage (CV) mode because a charged voltage (i.e., $V_A$ and $V_B$ in FIG. 2) is held constant.

In other words, while a Li-ion battery is charged, the CC and CV modes are sequentially performed. In case of charging a dual-battery, charging current and voltage have respective curves as shown in FIG. 2.

As described above, however, the conventional charging machine has various disadvantages. From the graphs shown in FIG. 2, it can be noted that the charging power decreases gradually in the CV mode because the charging current tapers under the condition of constant voltage. Thus, a maximum charging power that can be supplied by a charging machine is not used in charging a multi-battery in the CV mode, and a total charging time of a multi-battery is therefore increased. Further, since a plurality of battery units of a multi-battery are charged one by one with a supportable electric power of an AC adaptor not being fully used, a total charging time of a multi-battery is in proportion to the number of its battery units.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a multi-battery charging apparatus and method that reduces a charging time of the multi-battery.

Another object of the present invention is to provide a multi-battery charging apparatus and method that concurrently charges a plurality of the battery units of a multi-battery by dividing an assigned charging power among the plurality of the battery units to reduce an overall charging time.

Another object of the present invention is to provide a multi-battery charging apparatus and method that increases a percentage of assigned power used to assigned power when charging multiple batteries in a multi-battery power source.

Another object of the present invention to provide multi-battery charging apparatus and method that charges another battery unit with remaining charging power at the same time when an assigned charging power is not fully used to charge a first battery unit of a multi-battery to shorten an overall charging time of the multi-battery.

To achieve at least the above objects in a whole or in part and in accordance with purposes of the present invention, as embodied and broadly described herein, there is provided an apparatus for charging a multi-battery having a plurality of battery units that includes a charger that converts supplied electric power to a battery charging power having a current below a limited value, and a controller that receives the battery charging power from said charger, wherein the controller charges a first battery unit of the multi-battery, wherein the controller charges a second battery unit along with the first battery unit if a charging state of the first battery unit reaches a first preset condition, and wherein the controller charges the second battery unit with a current of the limited value when the first battery unit reaches a second preset condition.

To further achieve at least the above objects in a whole or in part, there is provided a method of charging a multi-battery having a plurality of battery units in accordance with the present invention that includes selecting a first battery unit of the multi-battery and charging the selected first battery unit, checking whether a charging state of the first battery unit reaches a preset value, selecting a second battery unit and charging the selected second battery unit along with the selected first battery unit when the preset value is reached, and charging the second battery unit with an assigned current of a limited value when the first battery unit reaches a sufficient charge.

To achieve at least the above objects in a whole or in part and in accordance with purposes of the present invention, as embodied and broadly described herein, there is provided an apparatus for charging a multi-battery having a plurality of battery units that includes a charger that outputs a battery charging power having an assigned level current, a battery selector that receives the assigned level current and is selectively coupled to the plurality of battery units, and a controller that controls the battery selector to charge a second battery unit in each of a first mode with a first level current below the assigned level current, a constant current mode and a constant voltage mode, wherein when the second battery unit is charged in the first mode a first battery unit is concurrently charged in the constant voltage mode to reduce an overall charge time of the multi-battery.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
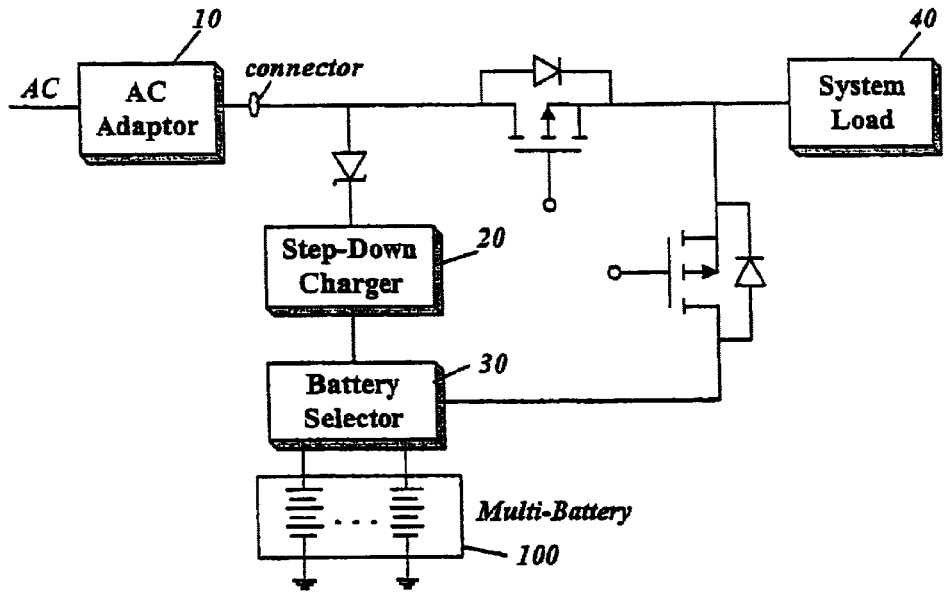
FIG. 1 is a block diagram that shows a conventional charging machine.
Figure 2:
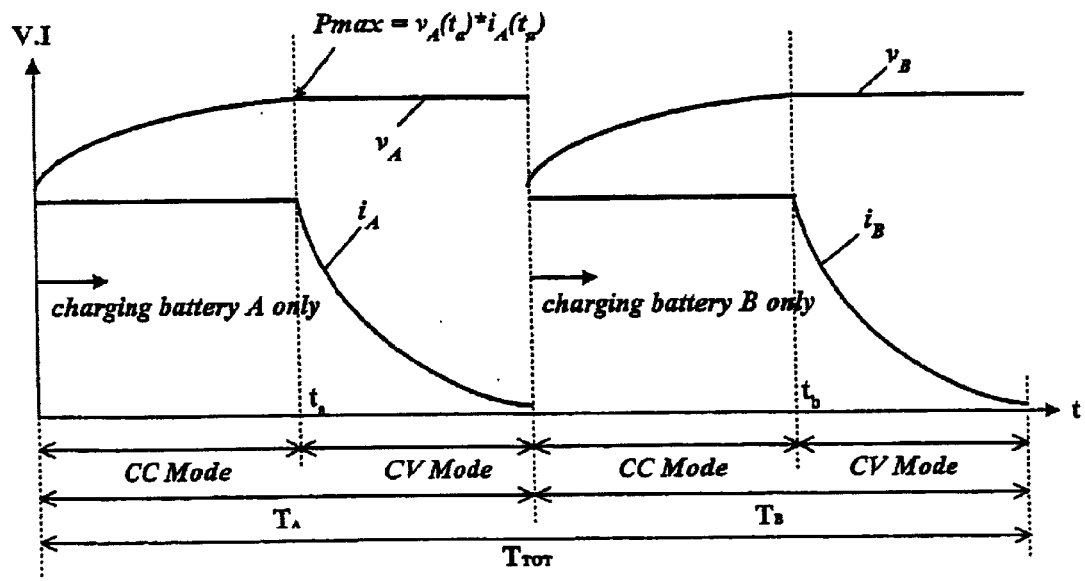
FIG. 2 is a diagram that shows a graph of voltage and current obtained in a conventional sequential charging process for a Li-ion multi-battery.
Figure 3:
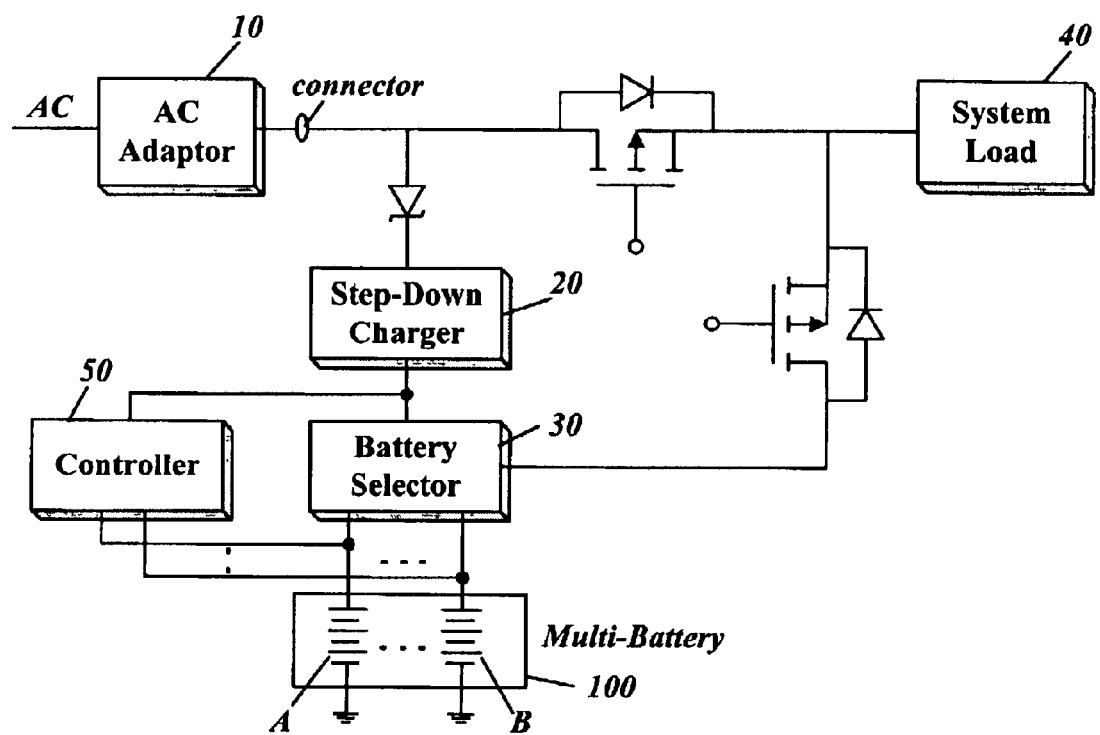
FIG. 3 is a diagram that shows a preferred embodiment of a multi-battery charger in accordance with the present invention.

In order that the present invention may be fully understood, preferred embodiments thereof will now be described with reference to the accompanying drawings. FIG. 3 is a block diagram that shows a preferred embodiment of a charging apparatus for charging a multi-battery in accordance with the present invention. The charging apparatus of FIG. 3 can be used for a portable computer or the like. As shown in FIG. 3, the preferred embodiment of a multi-battery charger includes, in addition to the elements of FIG. 1, a controller 50 that preferably makes a charging current be applied to at least two battery units at the same time within a limited charging power or a power assigned by a system to a charging capability.

Figure 4:
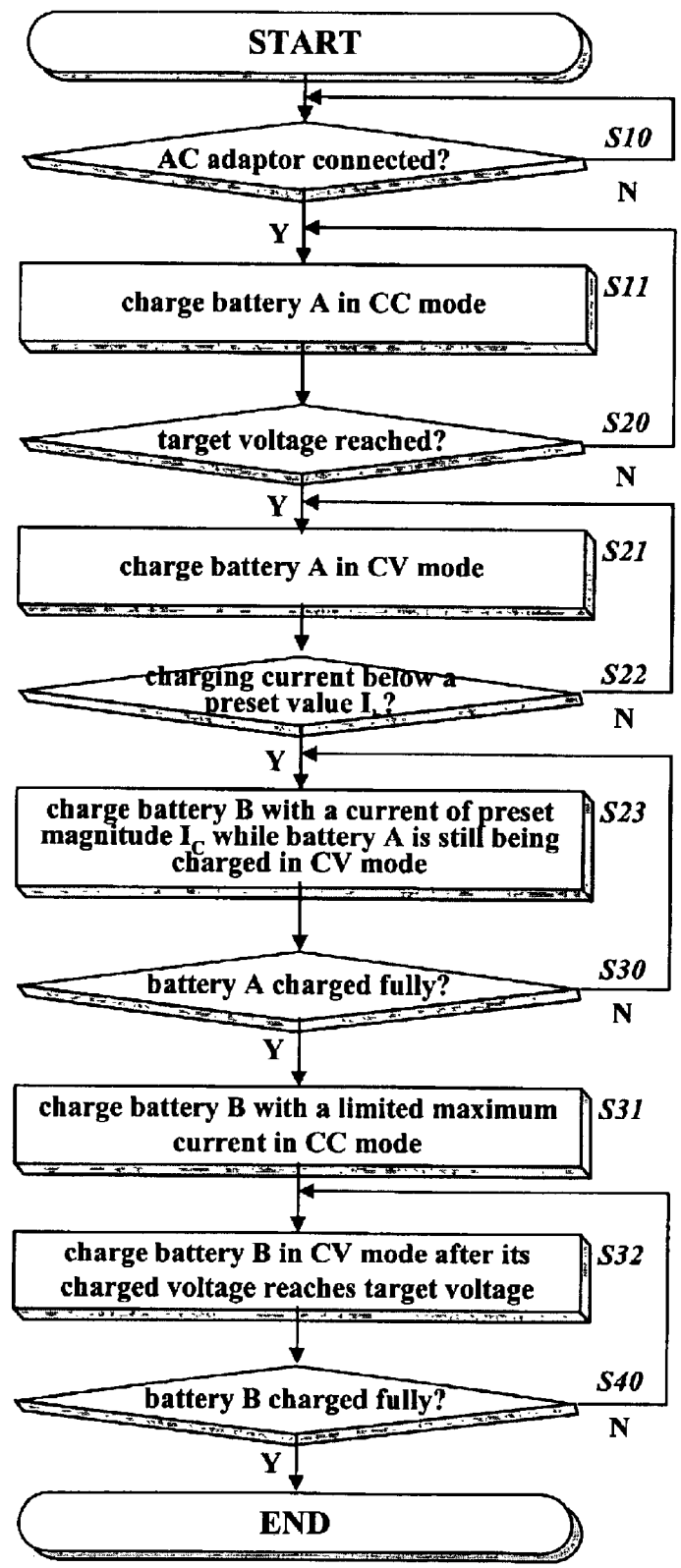
FIG. 4 is a flow chart that shows a preferred embodiment of a multi-battery charging method in accordance with the present invention.

FIG. 4 is a flow chart that shows a preferred embodiment of a multi-battery charging method. The preferred embodiment of the multi-battery charging method can be performed, for example, by the charging apparatus of FIG. 3 in accordance with the present invention. In describing the charging method shown in FIG. 4, it is assumed that a multi-battery to charge is a Li-Ion dual-battery with two battery units A and B.

After a process starts as shown in FIG. 4, when an AC adaptor 10 is coupled to the charging machine to charge a dual-battery 100, a step-down charger 20 steps down a DC output of the AC adaptor 10 to match charging condition of the dual-battery 100 (step S10). Otherwise, a check for connection of the AC adaptor 10 is repeatedly performed (step S10).

When the AC adaptor 10 is connected, a power rail of the battery selector 30 is coupled to the first battery unit A of the dual-battery 100. Then, the charging current of limited maximum magnitude (e.g., $I_{LIMIT}$) is outputted from the step-down charger 20 and the battery unit A starts to be charged in the CC mode (step S11), as shown in FIG. 5(a).

The charged voltage of the battery unit A increases gradually during the CC mode until it reaches a target voltage, e.g., 4.2V (at $t_1$). When the charged voltage becomes the target voltage (e.g., 4.2V) (step S20), the battery unit A starts to be charged in the CV mode (step S21) so that the charging current $i_A$ tapers. Otherwise, the CC mode continues (step S20).

Figure 5A:
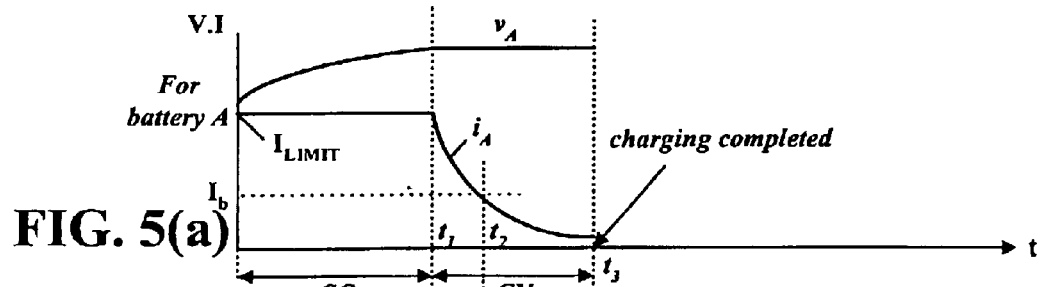
FIG. 5 is a diagram that shows graphs of current, voltage, and electric power arising from preferred embodiments of a multi-battery charging process according to the present invention.

As shown in FIG. 5(a), in the CV mode, the controller 50 preferably keeps comparing the charging current $i_A$ of the battery unit A with a preset threshold $1b$ (step S22). When the charging current $i_A$ decreases below the threshold $1b$ (e.g., at $t_2$) the controller 50 supplies another charging current $i_{B1}$ to a charging path coupled to the next battery B. The charging current $i_{B1}$ is fed from the step-down charger 20, which at this time is not fully outputting the limited current $I_{LIMIT}$. While the battery unit B is additionally charged, the battery unit A is being still charged in the CV mode (step S23). As shown in FIG. 5(a), the threshold $I_b$ is set to about a half of the limited current $I_{LIMIT}$. However, the present invention is not intended to be so limited.

Figure 5B:
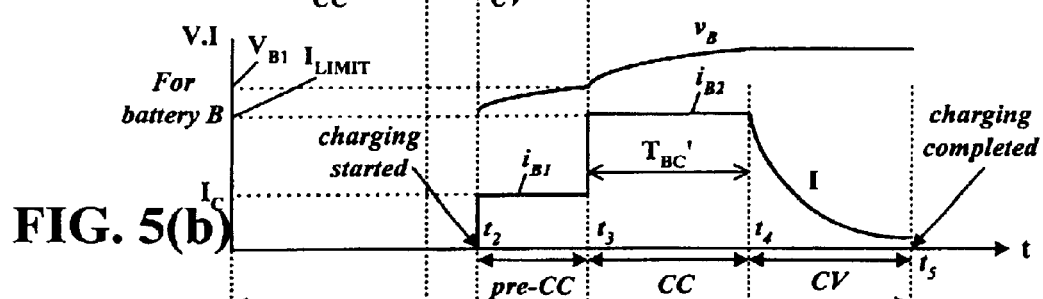

Because the charging current $i_A$ is still supplied to the battery unit A, the charging current $I_C$ (e.g., $i_{B1}$ as shown in FIG. 5(b)) must be less than and can not be the limited value $I_{LIMIT}$. Therefore, the controller 50 preferably limits the charging current $i_{B1}$ to $I_C$, which is equal to or less than '$I_{LIMIT}-I_b$'. As a result, the step-down charger 20 is not overloaded and does not exceed its assigned power for charging. Consequently, the battery unit B is charged with current $i_{B1}$ of the limited current Ic in a mode (hereafter "pre-CC") as shown in FIG. 5(b) for at least a portion of the time the battery unit A is charged in the CV mode.

While the dual-charging operation for the battery units A and B is conducted as described above, the battery unit A is repeatedly checked to determine whether it is fully charged (step S30) as the charging current $i_A$ tapers to almost zero. At this time (e.g., at $t_3$) when the battery unit is preferably determined to be fully charged, the battery selector 30 switches the power rail to the next battery unit B.

Accordingly, the controller 50 stops supplying the current $i_{B1}$ to the charging path of the battery unit B when the current $i_A$ charging the battery unit A is almost zero. Since the controller 50 does not use a charging current now, it is possible to supply a charging current $i_{B2}$ of the limited magnitude $I_{LIMIT}$ through the selected power rail in the battery selector 30. Therefore, the charging current $i_{B2}$ of $I_{LIMIT}$ is supplied (e.g., CC mode) from the step-down charger 20 to the battery unit B having a charged voltage below the target voltage (step S31).

Figure 5C:
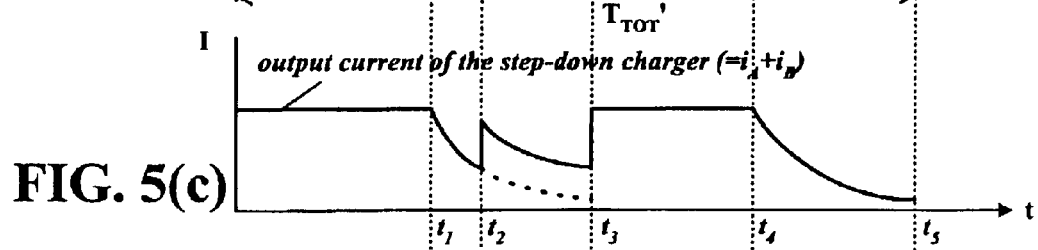
Figure 5D:
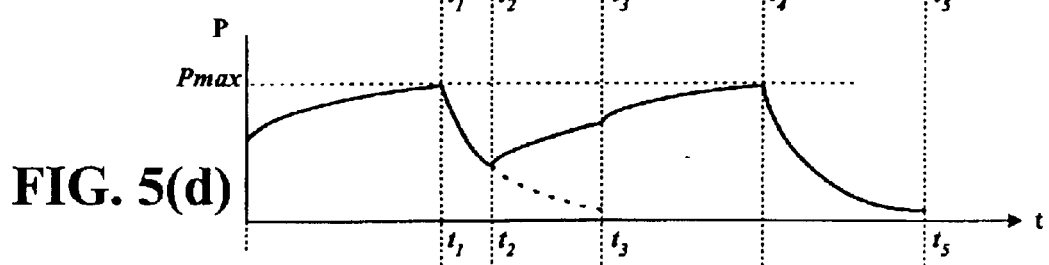
Figure 5E:
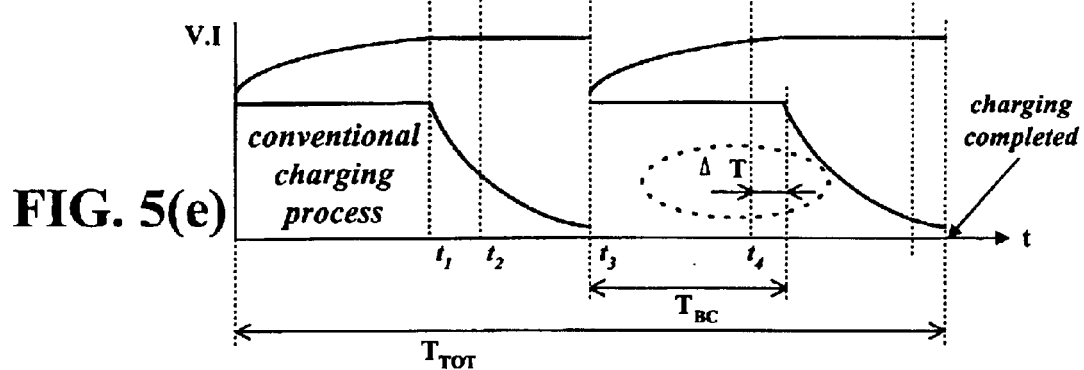

As shown in FIG. 5(b), the period TBC' taken from when the battery unit A is fully charged (e.g., at $t_3$) to when the battery unit B reaches the target voltage (e.g., at $t_4$) is shorter than the period $T_{BC}$, as shown in FIG. 5(e), taken by the conventional sequential charging process. Such a reduction in charging time is because the battery unit B has been already charged up to a certain voltage (e.g., $V_{B1}$) through the pre-CC mode before charging operations progress for the battery unit B in the CC mode.

When the battery unit B reaches the target voltage (e.g., at $t_4$) in the CC mode (step S32), it is charged in the CV mode until charged fully (step S40). Then, the process ends.

According to the charging operation described above, the total charging time $T_{TOT}'$ of the dual-battery is shortened by $\Delta T (=T_{BC}-T_{BC}')$ in comparison with the total charging time $T_{TOT}$ taken by the conventional charging method. Graphs showing current and electric power supplied from the step-down charger 20 according to the preferred embodiment of FIG. 3 are shown respectively in FIGS. 5(c) and 5(d).

To verify effectiveness of the preferred embodiment of the charging process of FIG. 4, exemplary test results were obtained. An experiment using a notebook computer with a Li-ion dual-battery was conducted. Experimental results showed that about 5 hours to 5 and a half hours were taken to charge the dual-battery by the charging process of FIG. 4 while about 6 hours are taken by the conventional charging process.

The preferred embodiments were described with a dual-battery multi-battery. However, the present invention is not intended to be so limited. If it is assumed there is another battery unit C next to the battery unit B in a multi-battery, similar charging operations that were conducted for the battery units A and B are performed for the battery units B and C. For example, the controller 50 keeps comparing the current $i_{B2}$ charging the battery unit B with the threshold $I_b$ while the battery unit B is charged in the CV mode, and if below $I_b$ it supplies an additional constant charging current of $I_C$ to the battery unit C to charge in the pre-CC mode. When the battery unit B is completely charged, charging current of the limited value $I_{LIMIT}$ is supplied to the battery unit C through the battery selector 30 in order that the battery unit C might be charged in CC mode.

Preferred embodiments of the present invention were described using a controller and battery selector to supply current in a pre-CC mode. However, the present invention is not intended to be so limited. Alternatively, the controller could sense battery status and control or provide information to battery selector 30. Further, multiple battery selectors could be used or controlled such as by the controller 50.

As described above, preferred embodiments of a multi-battery charging apparatus and method have various advantages. The preferred embodiments of multi-battery charging apparatus and method shorten total charging time of a multi-battery by more than about 8%, as a result, heating time of components of a charging machine is reduced, which results in lifetime extension of each component.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for charging a multi-battery composed of a plurality of battery units, comprising:

a charger that converts supplied electric power to a first power having a current reference value; and a controller that receives the first power from said charger, wherein the controller charges a first battery unit of the multi-battery, wherein the controller charges a second battery unit along with the first battery unit if a charging state of the first battery unit reaches a first condition, wherein the controller charges the second battery unit with a current substantially equal to the reference value when the first battery unit reaches a second condition, and wherein the first and second battery units have unequal charges when the controller concurrently charges both the first and second battery units.

2. The apparatus of claim 1, wherein said controller conducts a dual-charging operation for the first and the second battery units when a current charging the first battery unit decreases to a first magnitude, which is smaller than the reference value.

3. The apparatus of claim 2, wherein said controller charges the second battery unit with a constant current of a second magnitude which is smaller than the reference value while the first and the second battery units are charged together.

4. The apparatus of claim 3, wherein the second magnitude is equal to or smaller than the reference value subtracted by the first magnitude.

5. The apparatus of claim 1, wherein the first battery unit is charged in constant current mode until the first condition is satisfied, and wherein the first battery unit is charged in constant voltage mode after the first condition is satisfied.

6. The apparatus of claim 1, wherein the second battery unit is charged with the reference value current after the second battery unit is charged with a reduced prescribed magnitude current less than the reference value current, and wherein when a charged voltage reaches the first condition the second battery unit is charged as the current decreases.

7. The apparatus of claim 1, wherein said controller comprises:

a selecting means for selecting one battery unit of the multi-battery and supplying the first power from said charger to the selected battery unit; and a controlling means for supplying a current of a second magnitude to another battery unit other than the selected battery unit if a current charging the selected battery unit becomes below a first magnitude, both of the first and the second magnitude currents being smaller than the reference value current.

8. The apparatus of claim 7, wherein both of the first and the second magnitude currents are approximately equal.

9. A method of charging a multi-battery having a plurality of battery units, comprising:

(a) selecting a first battery unit of the multi-battery and charging the selected first battery unit;

(b) checking whether a charging state of the first battery unit reaches a preset first prescribed value;

(c) selecting a second battery unit and charging the selected second battery unit along with the selected first battery unit, wherein a charging state of the selected second battery does not equal the charging state of the selected first battery unit when the selected first and second battery units are simultaneously charging; and (d) charging the second battery unit and not charging the first battery unit when the charging state of the first battery unit is charged.

10. The method of claim 9, wherein, in said step (a), the first battery unit is charged with a reference level current until a charged voltage reaches a target voltage, and is charged with a decreasing current after the target voltage is reached.

11. The method of claim 9, wherein said step (b) checks whether a current charging the first battery unit decreases to a first magnitude which is below a reference value.

12. The method of claim 9, wherein said step (c) supplies the second battery unit with a current of a second magnitude which is below a reference value.

13. The method of claim 9, wherein a current sum of charging currents supplied to both the first and the second battery unit in said step (c) does not exceed a reference value.

14. The method of claim 9, wherein, in said step (d), the second battery unit is charged with a reference current until a charged voltage reaches a target voltage, and is charged with a decreasing current after the target voltage is reached.

15. An apparatus for charging a multi-battery having a plurality of battery units for a personal computer, comprising:
- a charger that outputs a battery charging power having an reference level current;
- a battery selector that receives the reference level current and is selectively coupled to the plurality of battery units; and
- a controller that controls the battery selector to charge a second battery unit in each of a first mode with a first level current below the reference level current, a second mode being a constant current mode and a third mode being a constant voltage mode, wherein a first battery unit is concurrently charged in the third constant voltage mode when the second battery unit is charged in the first mode.

16. The apparatus of claim 15, wherein in the constant current mode the reference level current is provided to a single battery unit, and wherein the controller monitors a status of the battery units.

17. The apparatus of claim 15, wherein the reference level current is insufficient to charge two battery units in the second constant current mode.

18. The apparatus of claim 15, wherein a charge level of each of the first and second battery units is different when the second battery unit is concurrently charged with the first battery unit.

19. The apparatus of claim 15, wherein the second battery unit is sequentially charged in the first mode, the second mode and the third mode.

20. The apparatus of claim 1, wherein the controller charges battery units in each of a first pre-constant current mode, a second constant current mode and a third constant voltage mode, and wherein the second battery unit is sequentially charged in the first mode, the second mode and the third mode.

21. The method of claim 9, wherein the charging the selected second battery unit comprises charging in each of a first mode with a first level current below a reference level current, a second mode being a constant current mode and a third mode being a constant voltage mode, and wherein the second battery unit is sequentially charged in the first mode, the second mode and the third mode.

22. An apparatus for charging a multi-battery composed of a plurality of battery units, comprising:
- charging means for converting supplied electric power to a first power having a current reference value; and
- controlling means for receiving the first power from said charging means and for charging a second battery unit along with a first battery unit if a charging state of the first battery unit reaches a first condition, wherein the controlling means charges the second battery unit with a current substantially equal to the reference value when the first battery unit reaches a second condition, and wherein the first and second battery units have unequal charges when the controlling means concurrently charges both the first and second battery units.

23. The apparatus of claim 1, wherein the current reference value indicates that it is a charging current of limited maximum magnitude outputted from the charger.

* * * * *